United States Patent
Weldemariam et al.

(10) Patent No.: US 10,977,030 B2
(45) Date of Patent: Apr. 13, 2021

(54) PREDICTIVE CODE CLEARANCE BY A COGNITIVE COMPUTING SYSTEM

(71) Applicant: INTERNATIONAL BUSINESS MACHINES CORPORATION, Armonk, NY (US)

(72) Inventors: Komminist Weldemariam, Nairobi (KE); Abdigani Diriye, Nairobi (KE); Shikhar Kwatra, Morrisville, NC (US); Paul Krystek, Highland, NY (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 16/154,699

(22) Filed: Oct. 8, 2018

(65) Prior Publication Data

US 2020/0110600 A1    Apr. 9, 2020

(51) Int. Cl.
*G06F 8/72*      (2018.01)
*G06N 3/08*      (2006.01)
*G06F 8/77*      (2018.01)
*G06F 11/36*     (2006.01)
*G06K 9/62*      (2006.01)
*G06N 3/04*      (2006.01)

(52) U.S. Cl.
CPC .................. *G06F 8/72* (2013.01); *G06F 8/77* (2013.01); *G06F 11/3616* (2013.01); *G06K 9/6256* (2013.01); *G06N 3/0445* (2013.01); *G06N 3/08* (2013.01)

(58) Field of Classification Search
CPC .......... G06F 8/72; G06F 8/77; G06F 11/3616; G06K 9/6256; G06N 3/0445; G06N 3/08
See application file for complete search history.

(56) References Cited

U.S. PATENT DOCUMENTS

| | | | |
|---|---|---|---|
| 5,983,348 A | 11/1999 | Ji | |
| 6,189,146 B1 | 2/2001 | Misra | |
| 6,272,641 B1 | 8/2001 | Ji | |
| 6,317,868 B1 | 11/2001 | Grimm | |
| 7,353,503 B2 * | 4/2008 | Nair | ........................ G06F 8/433 717/151 |
| 7,359,865 B1 | 4/2008 | Connor | |

(Continued)

OTHER PUBLICATIONS

Nitin Bhatia, et al., "Fuzzy cognitive map based approach for software quality risk analysis," ACM SIGSOFT Software Engineering Notes archive, vol. 36 Issue 6, Nov. 2011, pp. 1-9.

(Continued)

*Primary Examiner* — Douglas M Slachta
(74) *Attorney, Agent, or Firm* — Shimon Benjamin; Otterstedt, Wallace & Kammer, LLP (57) ABSTRACT

An exemplary method includes obtaining a training set of code data that includes deprecated code; training a multi-layer neural network on the training set of code data to predict usage events for the deprecated code; predicting usage events for the deprecated code, in a first set of code data, using the trained multi-layer neural network; estimating a value of risk associated with the deprecated code in response to the predicted usage events; comparing the estimated value of risk to a threshold; and, in response to the estimated value of risk exceeding the threshold, implementing an ameliorative action regarding the deprecated code.

20 Claims, 5 Drawing Sheets

(56) References Cited

U.S. PATENT DOCUMENTS

| | | | |
|---|---|---|---|
| 7,389,211 B2 | 6/2008 | Abu El Ata | |
| 7,788,634 B2* | 8/2010 | Acott | G06F 8/38 |
| | | | 717/104 |
| 7,904,802 B1 | 3/2011 | Kolawa | |
| 7,904,909 B1* | 3/2011 | Reiner | G06F 9/5061 |
| | | | 709/223 |
| 8,516,446 B2* | 8/2013 | Williams | G06F 8/36 |
| | | | 717/126 |
| 9,069,967 B2 | 6/2015 | Wysopal | |
| 9,110,770 B1* | 8/2015 | Raju | G06F 8/77 |
| 9,619,779 B2* | 4/2017 | Fosback | G06F 8/75 |
| 9,645,817 B1 | 5/2017 | van Schaik | |
| 9,727,318 B2* | 8/2017 | Naveh | G06F 8/4435 |
| 10,114,637 B1* | 10/2018 | Willson | G06F 8/71 |
| 10,452,993 B1* | 10/2019 | Hart | G06F 16/13 |
| 2007/0250810 A1* | 10/2007 | Tittizer | G06F 8/73 |
| | | | 717/110 |
| 2008/0208754 A1 | 8/2008 | Zunke | |
| 2008/0243699 A1 | 10/2008 | Hilerio | |
| 2011/0173693 A1 | 7/2011 | Wysopal et al. | |
| 2013/0152044 A1* | 6/2013 | Salecker | G06F 8/77 |
| | | | 717/120 |
| 2015/0081363 A1* | 3/2015 | Taylor | G06Q 40/00 |
| | | | 705/7.14 |
| 2016/0004626 A1 | 1/2016 | Jain | |
| 2016/0274903 A1 | 9/2016 | Hill | |
| 2017/0235569 A1* | 8/2017 | Sturtevant | G06Q 40/12 |
| | | | 717/102 |
| 2017/0249235 A1* | 8/2017 | Staples | G06F 11/3688 |
| 2017/0357486 A1* | 12/2017 | DeLuca | G06F 8/30 |
| 2017/0372232 A1* | 12/2017 | Maughan | G06N 20/00 |
| 2018/0275970 A1* | 9/2018 | Woulfe | G06N 3/0445 |
| 2018/0300028 A1* | 10/2018 | Vora | G06F 3/0484 |
| 2018/0300127 A1* | 10/2018 | Wright | G06F 8/77 |
| 2019/0250893 A1* | 8/2019 | Pandit | G06F 8/30 |
| 2019/0303115 A1* | 10/2019 | Kelly | G06F 8/33 |
| 2019/0370036 A1* | 12/2019 | Desai | G06F 9/453 |
| 2020/0089485 A1* | 3/2020 | Sobran | G06F 8/65 |
| 2020/0110601 A1* | 4/2020 | Shah | G06F 8/75 |

OTHER PUBLICATIONS

Christoffer Rosen, et al., "Commit guru: analytics and risk prediction of software commits," ESEC/FSE 2015 Proceedings of the 2015 10th Joint Meeting on Foundations of Software Engineering, pp. 966-969.

Borges H, et al. "Predicting the popularity of GitHub repositories". In Proceedings of the The 12th International Conference on Predictive Models and Data Analytics in Software Engineering. Sep. 2016 9 (p. 9). ACM. available at https://arxiv.org/pdf/1607.04342. pp. 1-11.

Gupta M, et al. "Predicting future popularity trend of events in microblogging platforms". Proceedings of the American Society for Information Science and Technology. Jan. 2012;49(1): pp. 1-10.

* cited by examiner

PREDICTIVE CODE CLEARANCE BY A COGNITIVE COMPUTING SYSTEM

BACKGROUND

The present invention relates to the electrical, electronic, and computer arts, and more specifically, to predictive code clearance by a cognitive computing system.

Today, many developers use open source or licensed software as a first piece of code in their product software (second piece of code), for many reasons including: (i) to fast track development and go-to-market strategy; (ii) to benefit from extensively tested and widely used software packages, a piece of code, tools, etc.; (iii) for easy extendibility, plug-ability, etc.; (iv) to comply with standardization; etc. It is also common to see developers use a proprietary code, package, tool, etc. in their products.

For various reasons, e.g., discovery of software bugs or compliance issues, it may be necessary to deprecate certain code segments or packages that may be in use within an existing application. This can be accomplished by scanning the application code to detect the deprecated code. When the body of the application code has grown large, scanning can consume significant resources.

SUMMARY

Principles of the invention provide techniques for predictive code clearance by a cognitive computing system. For example, certain aspects provide a method and system that automatically detect and assess use of deprecated code in an application, based on a predictive contextual analysis. The method and system include a means for detecting the deprecated code in an application, a means for predicting the valuation of the deprecated code and the application in a specified time period T, and a means for estimating a multidimensional risk vector related to continued use of the deprecated code (e.g., brand reputation, loss of customers, personal reputation, monetary risk).

In one aspect, an exemplary method includes obtaining a training set of code data that includes deprecated code; training a multi-layer neural network on the training set of code data to predict usage events for the deprecated code; predicting usage events for the deprecated code, in a first set of code data, using the trained multi-layer neural network; estimating a value of risk associated with the deprecated code in response to the predicted usage events; comparing the estimated value of risk to a threshold; and, in response to the estimated value of risk exceeding the threshold, implementing an ameliorative action regarding the deprecated code.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Time efficiencies relative to previous scanning methods.
Reduced risk of missing deprecated code.
Predictions of a primary and/or secondary set of codes to be used in a next generation application.
Predictions of a primary and/or secondary set of codes to be potential acquisition candidates.

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
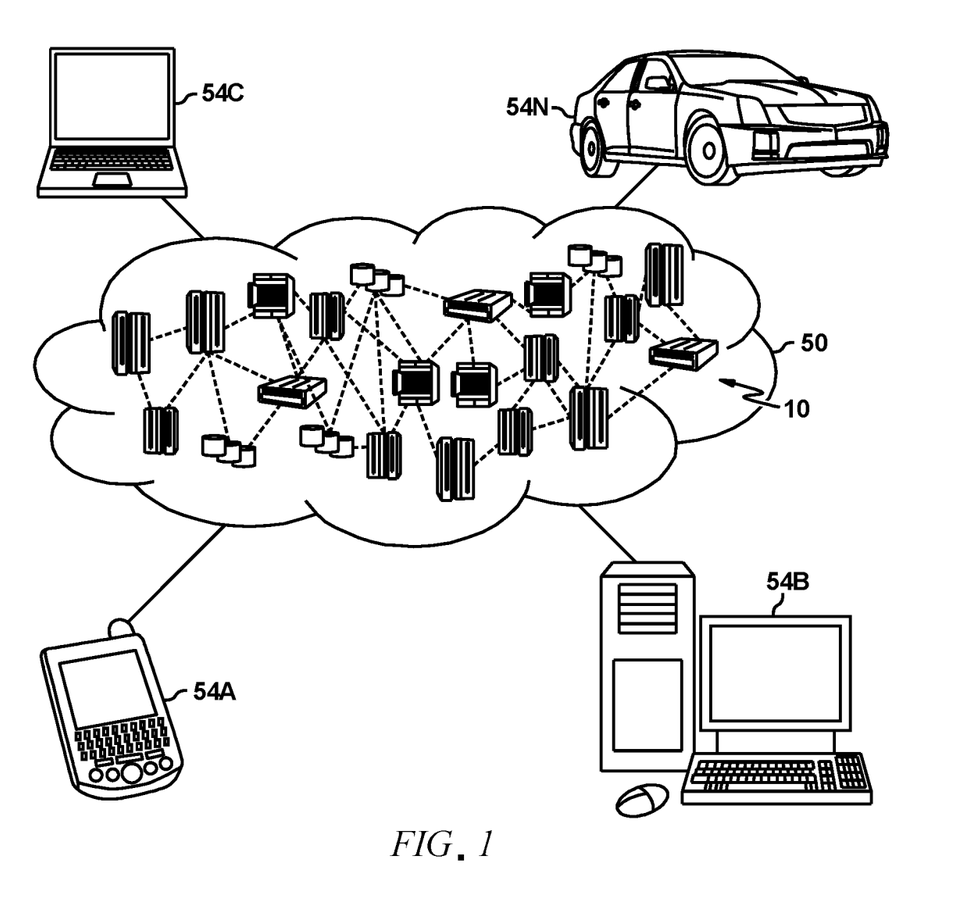
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
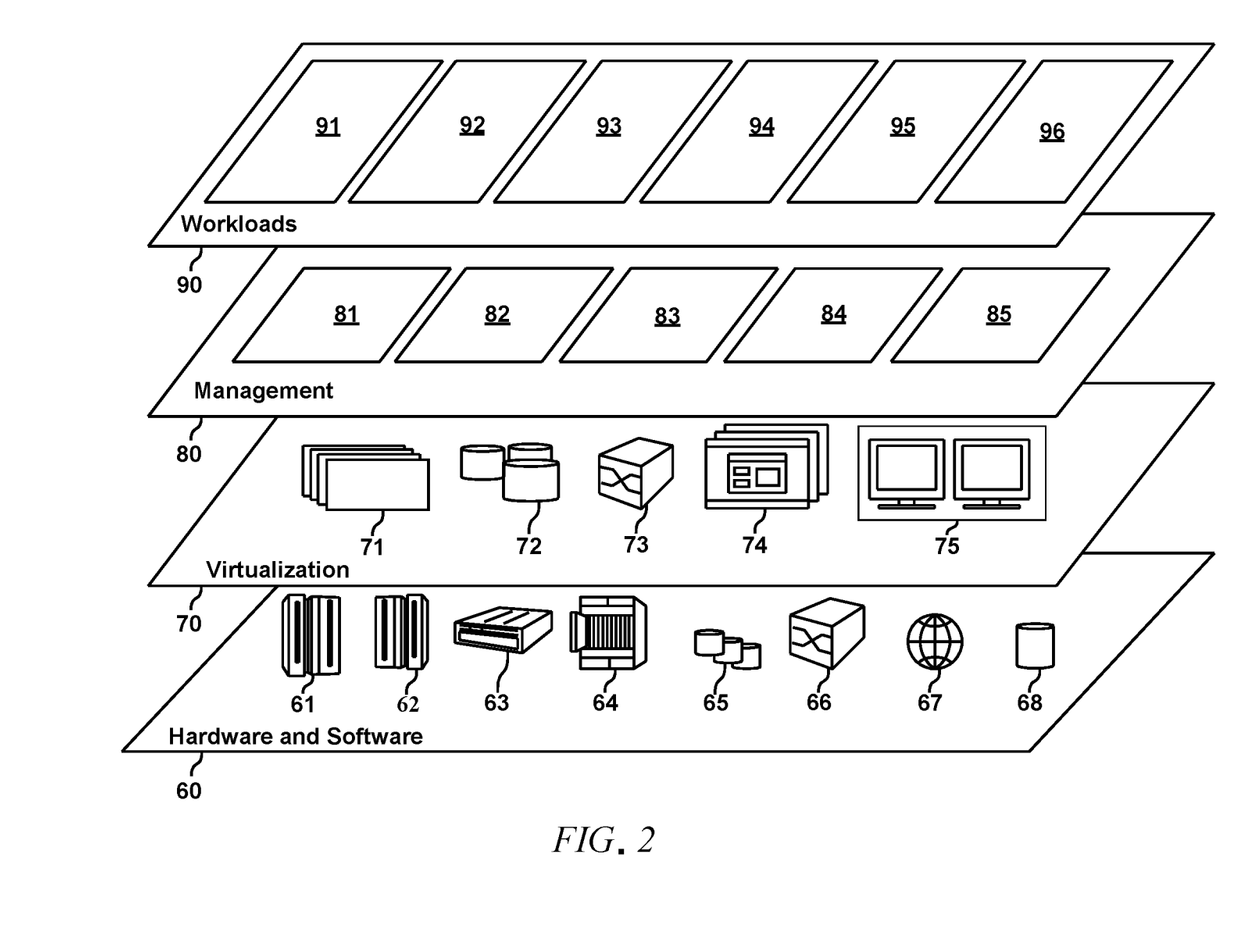
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a code scanning module 96.

Code scanning can be accomplished by static and/or dynamic techniques to analyze a code body for deprecated code and to alert a user of the scanning tool on detection of the deprecated code. For example, after scanning a code body, scanning tools may generate reports. As one example, when dependent open source packages are embedded in a primary source tree after a build, as in a /lib directory, a scanning tool can gather all component's source together in a directory tree, including the open source packages, and use another tool(s) against the dependent packages. As another example, a scanning tool can generate a standard compliance report for review. Some scanning tools detect keywords and alert a user to read a line of code that contains a keyword and then report to reviewers (e.g., senior programmers or coders) who further investigate.

For example, code scanning can be used to clear a code body from the presence of deprecated code. Typically, a manual code scanning is prone to human error, does not detect potential future risks (e.g., branding, etc.), and does not automatically implement preemptive ameliorative actions. For example, even when code risks have been detected a developer still can push the risky code to production environment (intentionally or unintentionally).

Advantageously, one or more embodiments provide time efficiencies relative to previous scanning methods. Previous pattern history related to understanding code risks and recording user's actions pertaining to said code risks helps in learning discrepancies which over time, helps in achieving time efficiencies. Advantageously, one or more embodiments provide lower risk of missing deprecated code by considering coding style profiles, cohort, and context of developers known to be involved in a project.

Advantageously, one or more embodiments predict a primary and/or secondary set of codes to be used in a next generation application. Advantageously, one or more embodiments predict a primary and/or secondary set of codes to be potential acquisition candidates. In one or more embodiments, predictions are accomplished using different data sources that are taken into account as feature sets in a learning algorithm, including data aggregated from crowdsource coding platforms including stackoverflow where people post questions and answers. For example, natural language processing (NLP) models can be trained to understand the context and content of comments. Further, predictions can account for reported success rate of using such upgraded coding techniques in the code (determined by code risk assessment as discussed) and can account for feedback obtained from customers regarding markups/changes in the code; taking into account multiple test cases and determining a detailed risk assessment may be used in reinforcement learning which trains a model in finding similar pieces of code and rectifying errors in a systematic fashion.

Accordingly, aspects of the invention provide a method and system that automatically detect and assess use of deprecated code in an application, based on a predictive contextual analysis. The method and system include a means for detecting the deprecated code in an application, a means for predicting the valuation of the deprecated code and the application in a specified time period T, and a means for estimating a multidimensional risk vector related to continued use of the deprecated code (e.g., brand reputation, loss of customers, personal reputation, monetary risk).

Further aspects provide for training a machine learning model to classify assessed valuation and risk vectors into actions that can be taken as part of a process for ameliorating deprecated code use, by gathering user feedback to define and improve the training set for the machine learning model.

Deprecated use of a code or a set of codes in an application may be related to identified problems with code execution or security permissions (i.e., bugs or exploits). Deprecated use also may be related to identification of code obtained from third parties, for which appropriate rights may not have been acquired; in such circumstances it can be desirable to replace the deprecated code with a functional equivalent that does not require acquisition of rights. One or more embodiments identify deprecated code based on analyzing a plurality of data sources, including one or more source codes, licenses, live feeds from web, historical data, cognitive factors of a developer or group of developers' context and characteristics, as well as analyzing cross-vendor code repositories that includes determining and analyzing various features inspired by social networks.

The method of understanding of the developer or group of developers' context and characteristics includes steps of identifying a developer's coding style (including his preferred way of coding style, coding template), experience level, and similarity among developers, etc.

The method of analyzing a plurality of data sources and understanding of a developer or developers further involves generating keywords and features, as further discussed below.

Based on the generated keywords and feature vectors, a next step of the inventive method includes predicting future states of deprecated code, of one or more applications that use or might use the deprecated code, or of a creator or corporate owner of the deprecated code, by running the keywords and feature vectors through a neural network trained model on multiple historic versions of prior code sets, along with corporate data contemporaneous with the historic versions of the prior code sets.

For example, one or more embodiments predict a risk of use of the deprecated code in next generation applications, compute an estimate of acquisition probability for the deprecated code and an estimate of popularity for the next generation application, compute importance of the deprecated code in the next generation application, and predict reputation scores of the deprecated code, the next generation application that might use the deprecated code, and the creator or corporate owner of the deprecated code. Risk of use and popularity are predicted based on crowdsourced data and comments that are obtained from crowdsource coding platforms such as stackoverflow, which supports a reinforcement strategy to determine a historical success rate of using the now-deprecated code or coding technique. Acquisition probability and reputation scores are predicted based on predicted popularity of the deprecated code.

Various machine learning and statistical models and/or algorithms (e.g., Bayesian probabilistic models, generative probabilistic framework, linear regressions) can be customized, based on feedback learning as explained above, for example, to predict code popularities, importance and popularity of the deprecated code, etc.

In one or more embodiments, the system of code clearance assistance uses at least one self-learning model (developed using historical data) that intelligently detects risks or issues related to the detected deprecated code use and then automatically builds a knowledge base for more improved future code scanning. Exception handling or corner cases are handled based on feedback learning from the past (pattern history) in order to take an ameliorative action. Knowledge of the time period in which a third party deprecated code was popular or frequently used can enable more effective deeper/focused scanning of previous product code for risks. In one or more embodiments, the at least one self-learning model is configured and integrated with existing workflow tools (e.g., GitHub, JIRA, Slack, etc.) to continuously scan code and update its knowledge base. The method further iteratively builds a cognitive understanding of what type of code was used for categories of software over time, to prioritize faster, deeper and/or more focused scanning for additional instances of deprecated code already found via this scanning process. Thus, the at least one self-learning model learns from its own experiences over time.

In one or more embodiments, the self-learning model runs in the background as code is being developed so that a relative risk score can be computed in real-time.

In one or more embodiments, a graphical user interface (GUI) is provided to review, control, and manage the relative risk score at any point in the code development (e.g., active recent scan results are available at any time to account for training of code scanning engine based on reinforcement learning, which may update the scan results even if code base has not changed). One example of user interface that could be employed in some cases is hypertext markup language (HTML) code served out by a server or the like, to a browser of a computing device of a user. The HTML is parsed by the browser on the user's computing device to create the GUI.

In one or more embodiments, the self-learning model builds one or more lists of library data that are incorporated into an application code body, for use in future scanning of legacy code bodies.

In one or more embodiments, the self-learning model provides reports on deprecated code that include references to locations in the application code body. Such reports facilitate senior code program managers to assess risk with regard to third party software during development of a new application code body. Based on predicted context and states of the deprecated code (and the application), the self-learning module estimates a predicted value of the deprecated code within the application. Different thresholds exist for different parts of code or program fragments existing in the application. Every program fragment is rated as low, medium or high risk with an explanation of the rating. In one or more embodiments, the self-learning model estimates a multidimensional risk vector associated with the features of the deprecated code and the application, with a certain confidence level C, based on an analysis of the valuation of the deprecated code use in the current and predicted application state and context, an analysis of the cognitive characteristics and context (including historical data) of the developer or group of developers, and an analysis of the company historical data (e.g., historical risks related to how much the company or brand has been targeted relative to its competitors within the last 2-6 years). The self-learning model stores or represents the multidimensional risk vector in a multidimensional array along different dimensions of risk. By way of an example, a multidimensional risk vector includes a brand and image reputation/recognition risk, brand positioning risk, risk related to loss of customers, personal reputation risk, monetary risk, etc. Brand reputation risk means predicted loss to current reputation of the brand, whereas brand positioning risk implies any changes in how they would position themselves considering existing code risks while code assessment was performed. In one or more embodiments, the self-learning model computes a single risk score R that aggregates the multidimensional risk vector. By running the neural network model on the multidimensional risk vector, the risk assessment further may determine the risk of damaging additional brand based on the estimated probability of code (and application) popularity score, code/application importance score, and reputation score of the company, etc.

Figure 3:
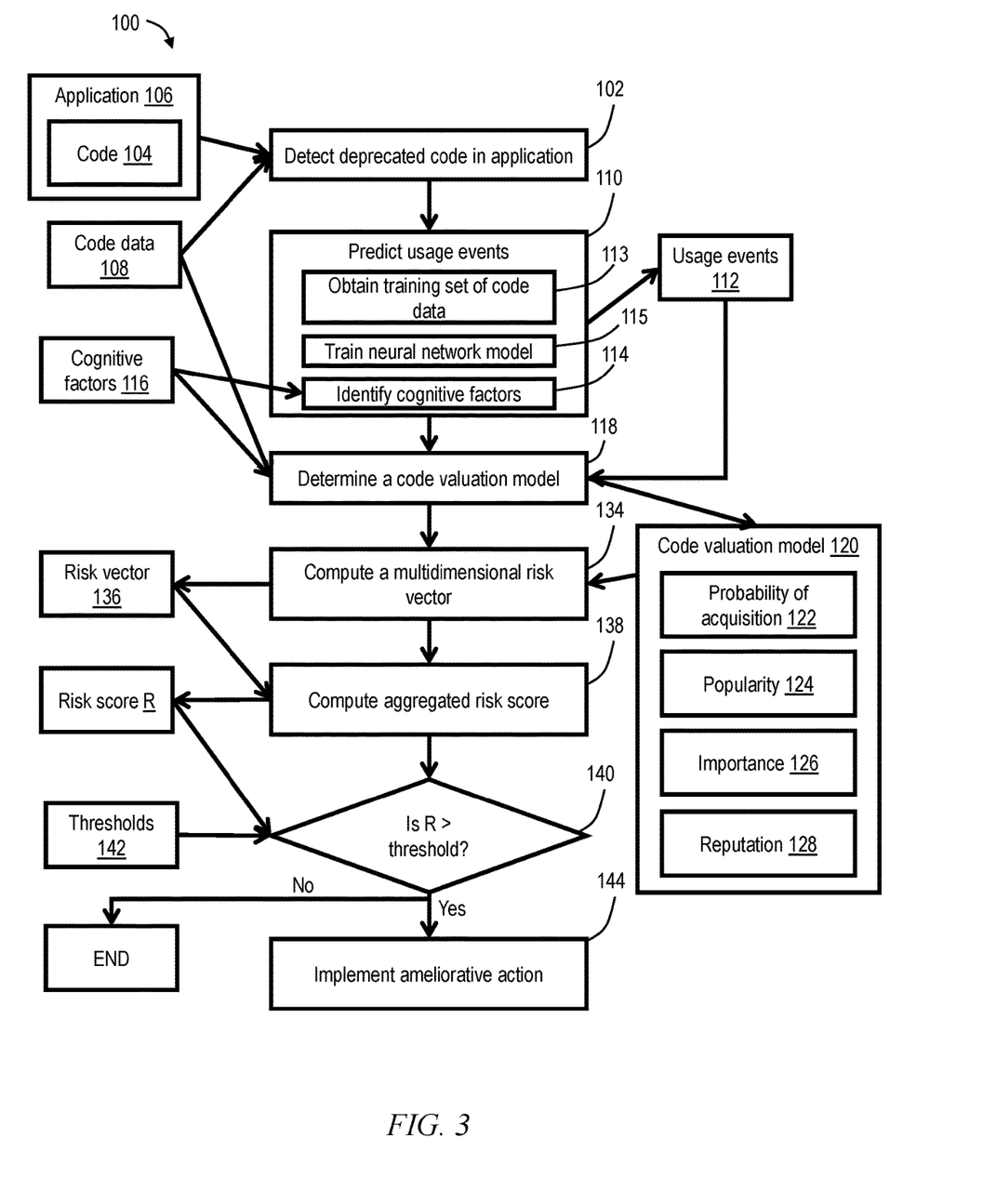
FIG. 3 depicts a method of predictive code clearance according to an exemplary embodiment.

Thus, referring to FIG. 3, a method 100 of predictive code clearance includes, at 102, detecting deprecated code 104 in an application 106 based on a first set of code data 108 (e.g., source codes related to primary and secondary applications, licenses, live feeds from web, historical data, cross-vendor code repositories, social networks). Then at 110, the method 100 includes predicting application or deprecated code usage events 112 related to the application code body that includes the deprecated code, based on identifying cognitive factors 116 and on estimating a percentage of value z that the deprecated code contributes to the application code body. In one embodiment, at 113 a multi-layer neural network model obtains a training set of code data, and at 115 the neural network model is trained for the usage event predictor based on the training set of code data. At 114, the method 100 includes identifying cognitive factors 116 (e.g., coding style, preferences, experience level, cohort, etc.) for a developer or developers in the first set of code data. In one or more embodiments, identifying a developer or developers' cognitive factors 116, based on context and characteristics, includes analyzing historical coding style, preferences, experience level, cohort, and cross-vendor code repositories that include determining and analyzing various features inspired by social networks. Understanding the developer or group of developers' cognitive factors 116, based on context and characteristics, includes identifying a developer's coding style (including his or her preferred way of coding style, coding template), experience level, and similarity among developers, etc.

In one or more embodiments, identifying a coding style includes analyzing a time period of code development by: scanning and characterizing popular software used in that time period; scanning and characterizing software which was considered compliant to corporate or development area policies (e.g., supported) within time period of code development; and scanning and characterizing, individually or group-wise, popular software used commonly by an individual or group who worked on development of the application code body.

In a similar manner, historical use of deprecated code by specific coding individuals or coding teams can be identified by the self-learning model and built into the model's knowledge base. In one or more embodiments, the self-learning model leverages the knowledge base to scan current or future code in a more focused/deeper manner associated with the specific individuals or coding teams who have historically used deprecated code.

In one or more embodiments, the self-learning model's knowledge base incorporates historical cognitive knowledge of what code was supported for use within a company during a given period of time, which assists the self-learning model in more efficient detection of code risks for deeper/focused scanning of deprecated code, which once may have been company supported for new product development.

It will be appreciated in light of this disclosure that understanding of cognitive factors is developed by analyzing a plurality of data sources and understanding of a developer or developers further involves generating keywords and features. Natural language processing (NLP) extracts keywords and phrases including comments from crowdsourced data when a similar code is posted and users ask comments pertaining to using such code in their enterprise application. This is one of the input features. Multi-layer neural network algorithm is used where such input features include coding style, company's existing code template, mel frequency cepstral coefficients (MFCC) for conversation monitoring. NLP for keyword analysis is used to understand the context of the code, corrections done in the past when a similar piece of code was written, developer's profile and questions posted by said developers etc. are fed into multi-layer neural network module with reconfigurable weights in order to make a determination and prediction of changes or customizations that can be done in the code. This acts as an enhanced version of existing code scanning techniques.

Still referring to FIG. 3, the method 100 further includes, at 118, determining a code valuation model 120 that includes, e.g., probability of acquisition model 122, code popularity model 124, importance model 126 that will be derived from a probability or percentage of value (z) of the deprecated code, reputation model 128, etc. based on predicted application usage events 112, the set of code data 108, and identified cognitive factors 116.

Figure 4:
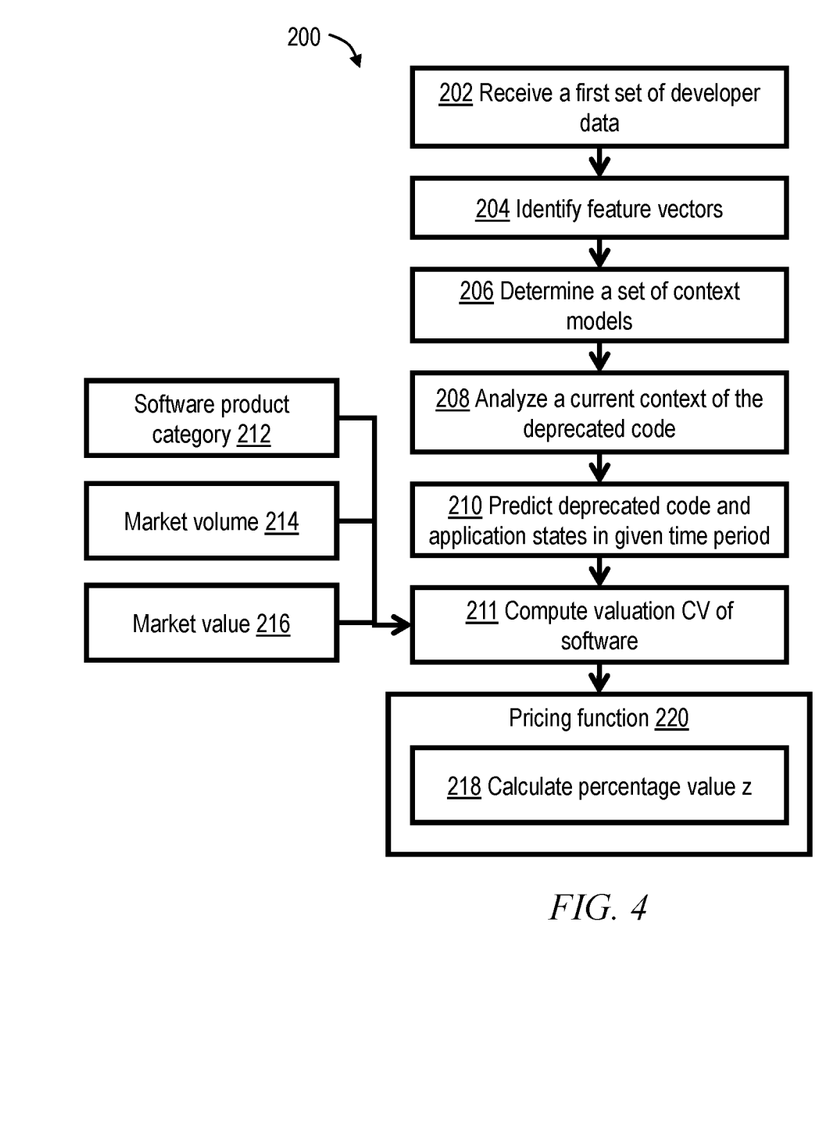
FIG. 4 depicts a method to compute the valuation of a code component, according to an exemplary embodiment.

By way of implementation example, FIG. 4 depicts a method 200 for implementing the code valuation model 120, which may include analyzing the potential earning/value of the software or product comprised by the code component. The method 200 for computing the value of the deprecated code includes at 202 receiving a first set of developer data; at 204 identifying feature vectors for the code in the first set of developer data; at 206 determining a set of context models, based on the identified feature vectors and the first set of developer data; at 208 analyzing a current context of the deprecated code and the application using NLP analysis and a trained neural network model to understand the mechanics of the application and code; and at 210 predicting the code and application states (e.g., predicted importance score, popularity score, value, etc.) in a given time period T.

Developer data includes, for example, previously written codes/software with associated metadata for each code/software such as historic code review, comments, etc. Feature vectors include, e.g., developer experience level, previous/current code popularity, number of downloads for at least one previous code developed, comments given for the at least one code developed, aggregated code quality, the number of stars of a repository is a direct measure of its popularity, etc.

In one or more embodiments, the method 200 includes at 211 computing the valuation (CV) of the software/product by taking into consideration the software/product category 212, market volume 214 and market value 216. The software/product category 212 is determined by initially representing the metadata associated with the software (this can be descriptors, class names, etc.) as a vector v={x1, x2, ..., xn}, where each x attribute represents the frequency of a given term within the metadata. By computing similarity between the vector representations of the software and of existing products (where the product descriptors, class names, etc. from each existing product is represented as a vector y={x1, x2, ..., xn}), a most similar product can be found. Then the market volume 214 and market value 216 are retrieved from a database containing the tuple for the most similar product, or can be calculated based on other data as discussed below.

Market volume is computed by: Market volume=Number of target customers×Penetration rate. Monetary value of the market is computed based on price expectations, Market value=Market volume×Expected price. The market value can be used to estimate the value of the product or expected revenue.

Next, at 218 a pricing function 220 calculates the value that the deprecated code contributes to the application code body based on two heuristics: a) A call-based approach that takes the total number of calls made in the product and works out percentage of calls made to or by the deprecated code; b) A computation-based approach that tabulates the total run-time of the software and works out the percentage of run-time computation used by the deprecated code. From the above heuristics the pricing function 220 generates a real number (z) that represents the percentage of value that the deprecated code contributes to the application code body, where: $0 \leq z \leq 1$.

To compute the valuation (CV) of the deprecated code, the pricing function multiplies the Market Value (MV) of the application code body by the probability or percentage of value (z) that the deprecated code contributes to the application code body. CV=MV×z. This formulation captures the property that the less utilized the code component is, the lower the valuation of the deprecated code. For example, the market value (MV) of the product could be $1,000,000 and the code component could comprise 0.10 percent of the value of the code, so that the overall valuation for the deprecated code would be $100,000.

Referring again to FIG. 3, the method 100 further includes, at 134, computing a multidimensional risk vector 136 based on the valuation CV that was produced by the code valuation model 120. If the valuation model indicates the application or deprecated code has "high/medium/low" value it will impact on the risk score. For example, if a code is deemed to be a high value (in terms of business term) and the predicted probability of the code to be used in future code or application is high, the cognitive code clearance system computes high risk. At 138, the method 100 further includes computing a single aggregated risk score R based on the multidimensional risk vector 136.

At 140, the method 100 includes checking whether the aggregated risk score R exceeds one or more of a set of thresholds 142. In response to the risk score R exceeding a threshold, at 144 the method 100 includes implementing an ameliorative action, e.g., enable the code/system not to compile, run or deploy, alert the manager, change the characteristics of the GUI of the system based on risk (e.g., GUI coloration), trigger secondary reviewers (e.g. developer, IP lawyer, manager) of the source code, slow down the system if the predicted risk is determined to be high, etc.

Figure 5:
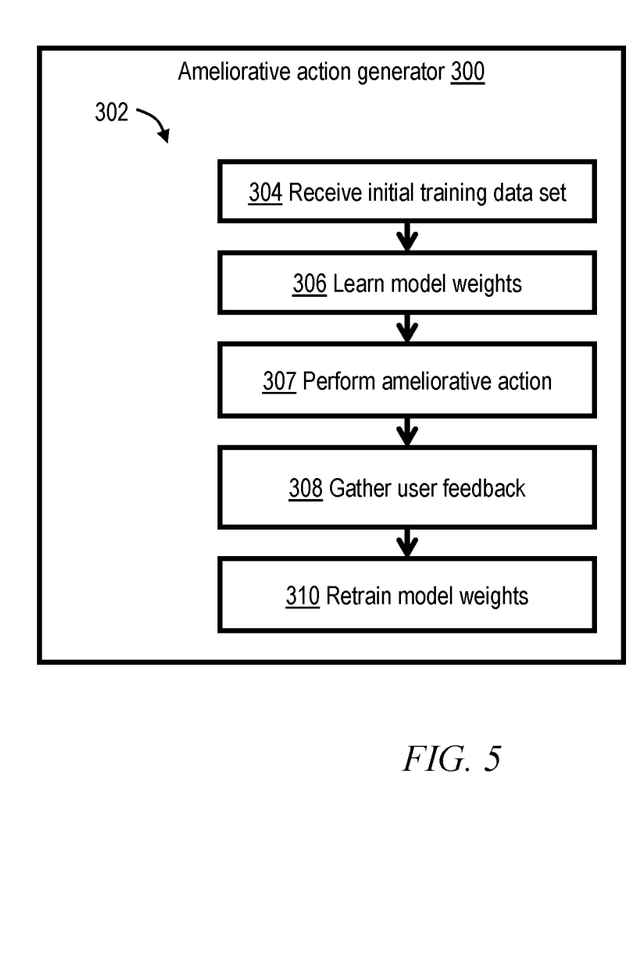
FIG. 5 depicts an ameliorative action generator module, according to an exemplary embodiment.

FIG. 5 depicts an ameliorative action generator module 300 for accomplishing ameliorative actions according to step 144 of the method 100. The ameliorative action generator module 300 implements a method 302. At 304, the ameliorative action generator 300 receives an initial training data set that is prepared by a domain expert by mapping multidimensional risk vectors to suitable ameliorative actions. Using this initial training set, at 306 the ameliorative action generator 300 learns model weights in a supervised fashion. Then, using the learned model weights, at 307 the ameliorative action generator performs one or more ameliorative actions in response to input code data sets that include deprecated code. Once the ameliorative action generator is in use, at 308 it gathers user feedback in order to establish whether any given action was a suitable response to the presence of deprecated code or what additional/other action should have been taken. The ameliorative action generator profiles users according to a hierarchy (seniority, number of years in industry, past accuracy, etc.) and accordingly weights their responses to the ameliorative action generator actions. A user's accuracy is a measurement of his or her historical success rate considering code modifications conducted by the user in conjunction with coverage of different test cases, abiding coding rules and strategies, etc. After a number of initial iterations, at 310 the self-learning ameliorative action generator retrains itself to learn an improved classification based on a filtered vector space of multidimensional risk vectors and actions defined by the user feedback. This re-training is done on a recurring schedule for ongoing refinement of the learning model. In certain embodiments, multiple labels (multi-class learning) can be estimated with confidence. The labels are input features which were aggregated and cleaned post pre-processing to form multi-dimensional vectors. When a particular risk associated with deprecated code exceeds an action threshold, one or more actions corresponding to that threshold are triggered. Exemplary actions include: deleting deprecated code from an application code body; replacing deprecated code with approved code of similar functionality; enable the code/system not to compile, run or deploy, alert the manager, change the characteristics of the GUI of the system based on risk (e.g., GUI coloration), trigger secondary reviewers (e.g. developer, IP lawyer, manager) of the source code, slow down the system if the predicted risk is determined to be high, etc.

In one or more embodiments, actions have annotations. As an example, certain actions are marked higher priority relative to others, or two actions are marked as mutually exclusive. Such annotations supersede the output of the ameliorative action generator. This means that if two actions are marked mutually exclusive and the ameliorative action generator classifies a multidimensional risk vector under both actions, the system would only execute the higher priority action (assuming priority annotation exists). Thus, the system allows for user feedback and intervention at multiple levels to build-in fail-safes that could be removed as the confidence in the learning/classification system improves over time.

Thus, one or more embodiments automatically detect and manage use of deprecated code in an application based on prediction and contextual analysis. Certain embodiments provide a means (e.g., a code scanning software module) for detecting the deprecated code in an application which may be related to current and future license violations; a means (e.g., a valuation software module) for predicting the valuation of the deprecated code and the application in a specified time period T; and a means (e.g., a risk estimator software module) for estimating a multidimensional risk vector (e.g., brand reputation, loss of loyal customers, personal reputation risk, monetary risk, proximity risk) associated with the use of the code in the application.

In one or more embodiments, valuation of the deprecated code (and of the application code body) incorporates one or more machine learning models that predict the deprecated code (and the application) use in future systems, the probability of acquisition of the deprecated code, and the probability of the deprecated code (and the application) popularity score, importance score and reputation score of the company, etc. Predictions are accomplished based on, among other things, previous pattern history and crowd-sourced monitoring data shared amongst different developers and feedback obtained from such.

In one or more embodiments, computing a multidimensional risk vector associated with the deprecated code and the application, with a certain confidence level C, includes analyzing the valuation of the deprecated code use and the current and predicted application state and context; analyzing the resulted cognitive, context, and characteristics (including historical ones) of a developer or a group of developers involved in the development of the application that uses the deprecated code; analyzing the company historical data (e.g., historical risks related to how much the company or brand has been targeted relative to its competitors within, for example, the last 2-4 years), etc. In one or more embodiments, analyzing the multidimensional risk vector further includes storing the computed multidimensional risk vector into a multidimensional array that includes different dimensions of risk such as risk related to brand and image reputation/recognition, brand positioning, loss of customers, personal reputation risk, monetary risk, proximity risk, etc. In one or more embodiments, analyzing the multidimensional risk vector further includes computing a single aggregated risk score R based on the multidimensional risk vector and managing the multidimensional array on a cloud-based database.

In one or more embodiments, detection of code risk is based on historical cognitive knowledge of what code was supported for use within a company (temporal period) by scanning for deprecated code that once may have been supported for new product development.

Given the discussion thus far, it will be appreciated that, in general terms, an exemplary method 100, according to an aspect of the invention, includes at 113 obtaining a training set of code data that includes deprecated code; at 115 training a multi-layer neural network model on the training set of code data to predict usage events for the deprecated code; at 110 predicting usage events for the deprecated code, in a first set of code data, using the trained multi-layer neural network model; at 134 estimating a value of risk associated with the deprecated code in response to the prediction of usage events; at 142 comparing the estimated value of risk to a threshold; and at 144, in response to the estimated value of risk exceeding the threshold, implementing an ameliorative action regarding the deprecated code.

In one or more embodiments, the ameliorative action includes deleting the deprecated code from the first set of code data. In one or more embodiments, the ameliorative action includes replacing the deprecated code with approved code. In one or more embodiments, the first set of code data includes data aggregated from crowdsource coding platforms.

In one or more embodiments, the exemplary method also includes at 304 obtaining a training data set that includes application code, deprecated code, and ameliorative actions that were performed on the application code in response to presence of the deprecated code within the application code; at 306 learning model weights in a supervised fashion in response to the training data set; at 307 performing an ameliorative action in response to an input code data set that includes deprecated code; at 308 gathering user feedback regarding the ameliorative action; and at 310 improving effectiveness of future ameliorative actions by retraining the model weights.

In one or more embodiments, ameliorative actions are annotated with priorities and are annotated as mutually exclusive, and performing an ameliorative action includes selecting only a higher-priority action to perform. In one or more embodiments, improving effectiveness of future ameliorative actions also includes updating the annotations of ameliorative actions in response to the user feedback.

Figure 6:
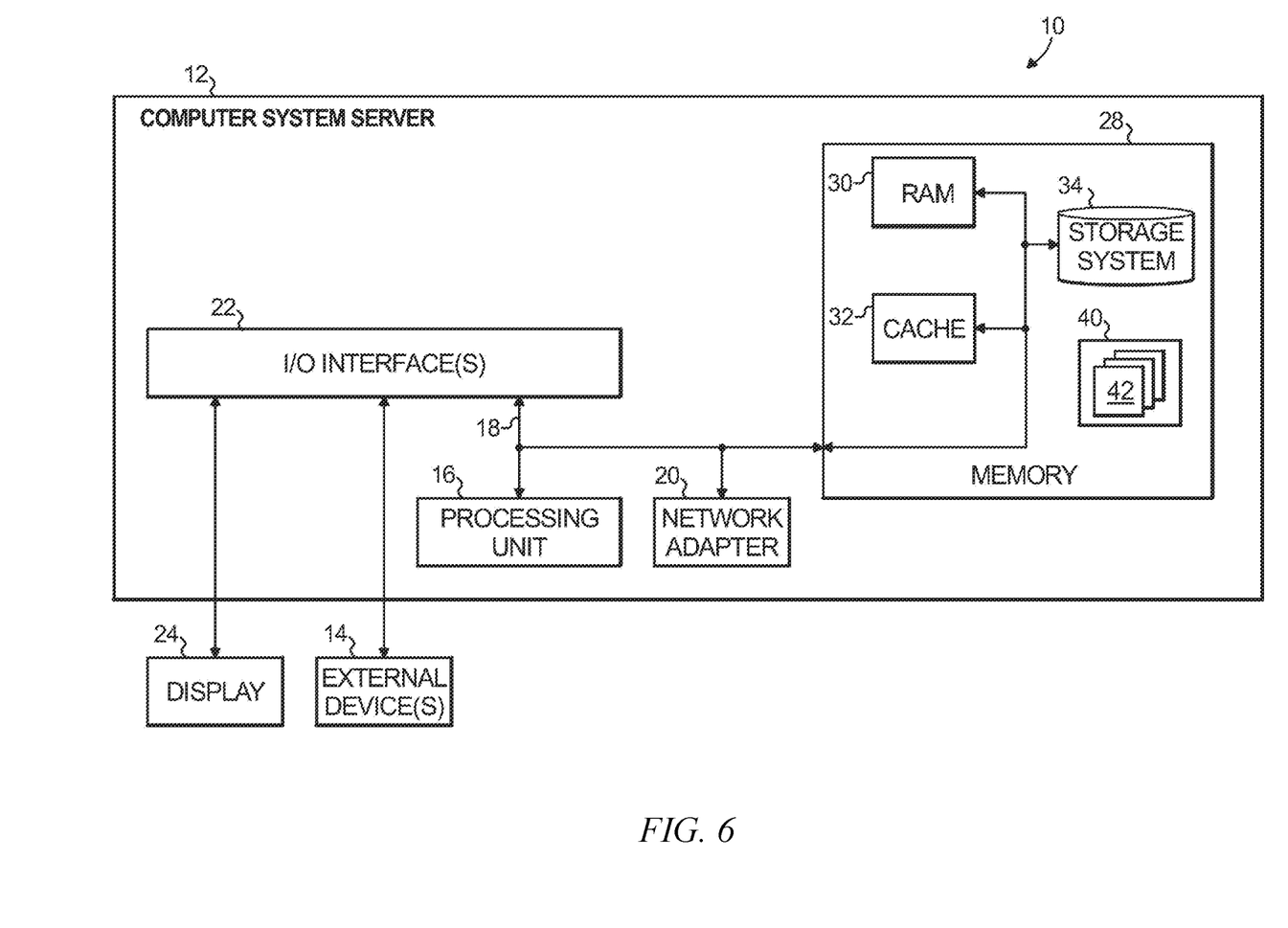
FIG. 6 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining a training set of code data that includes first deprecated code and that is associated with a first developer;
    training a multi-layer neural network model on the training set of code data to predict usage events for the first deprecated code;
    detecting second deprecated code in a first set of code data obtained from the first developer;
    calculating a value that the second deprecated code contributes to the first set of code data based on cognitive factors of the first developer, wherein the cognitive factors comprise at least one of coding style, preferences, experience level, cohort;
    predicting usage events for the second deprecated code in the first set of code data, using the trained multi-layer neural network model, based on the value that the second deprecated code contributes to the first set of code data;
    estimating a value of risk associated with the second deprecated code in response to the prediction of usage events and the value of the second deprecated code;
    comparing the estimated value of risk to a threshold; and
    in response to the estimated value of risk exceeding the threshold, implementing an ameliorative action in the first set of code data regarding the second deprecated code.

2. The method of claim 1 wherein the ameliorative action includes deleting the second deprecated code from the first set of code data.

3. The method of claim 1 wherein the ameliorative action includes replacing the second deprecated code with approved code.

4. The method of claim 1 wherein the first set of code data includes data aggregated from crowdsource coding platforms.

5. The method of claim 1 further comprising:
    obtaining a training data set that includes application code and previous ameliorative actions that were performed on the application code in response to presence of the first deprecated code within the application code;
    learning model weights of the multi-layer neural network model in a supervised fashion in response to the training data set;
    determining the ameliorative action to be implemented by applying the multi-layer neural network model to the first set of code data using the learned model weights;

gathering user feedback that includes code markups of a second set of code data resulting from the ameliorative action that was implemented; and retraining the model weights of the multi-layer neural network model in response to the user feedback.

6. The method of claim 5 further comprising:

annotating the previous ameliorative actions with priorities; and annotating two or more of the previous ameliorative actions as mutually exclusive, wherein determining the ameliorative action to be implemented includes selecting only a highest-priority action to perform.

7. The method of claim 6 further comprising: updating the annotations of the previous ameliorative actions in response to the user feedback.

8. A non-transitory computer readable medium embodying computer executable instructions which when executed by a computer cause the computer to facilitate the method of: obtaining a training set of code data that includes first deprecated code and that is associated with a first developer;

training a multi-layer neural network model on the training set of code data to predict usage events for the first deprecated code; detecting second deprecated code in a first set of code data obtained from the first developer;

calculating a value that the second deprecated code contributes to the first set of code data based on cognitive factors of the first developer, wherein the cognitive factors comprise at least one of coding style, preferences, experience level, cohort;

predicting usage events for the second deprecated code in the first set of code data, using the trained multi-layer neural network model, based on the value that the second deprecated code contributes to the first set of code data;

estimating a value of risk associated with the second deprecated code in response to the prediction of usage events and the value of the second deprecated code;

comparing the estimated value of risk to a threshold; and in response to the estimated value of risk exceeding the threshold, implementing an ameliorative action in the first set of code data regarding the second deprecated code.

9. The computer readable medium of claim 8 wherein the ameliorative action includes deleting the second deprecated code from the first set of code data.

10. The computer readable medium of claim 8 wherein the ameliorative action includes replacing the second deprecated code with approved code.

11. The computer readable medium of claim 8 wherein the first set of code data includes data aggregated from crowdsource coding platforms.

12. The computer readable medium of claim 8, the method further comprising:

obtaining a training data set that includes application code and previous ameliorative actions that were performed on the application code in response to presence of the first deprecated code within the application code;

learning model weights of the multi-layer neural network model in a supervised fashion in response to the training data set;

determining the ameliorative action to be implemented by applying the multi-layer neural network model to the first set of code data using the learned model weights;

gathering user feedback that includes code markups of a second set of code data resulting from the ameliorative action that was implemented; and retraining the model weights of the multi-layer neural network model in response to the user feedback.

13. The computer readable medium of claim 12 further comprising:

annotating the previous ameliorative actions with priorities; and annotating two or more of the previous ameliorative actions as mutually exclusive, wherein determining the ameliorative action to be implemented includes selecting only a highest-priority action to perform.

14. The computer readable medium of claim 13 further comprising: updating the annotations of the previous ameliorative actions in response to the user feedback.

15. An apparatus comprising:

a memory embodying computer executable instructions; and at least one processor, coupled to the memory, and operative by the computer executable instructions to facilitate a method of:

obtaining a training set of code data that includes first deprecated code and that is associated with a first developer;

training a multi-layer neural network model on the training set of code data to predict usage events for the first deprecated code;

detecting second deprecated code in a first set of code data obtained from the first developer;

calculating a value that the second deprecated code contributes to the first set of code data based on cognitive factors of the first developer, wherein the cognitive factors comprise at least one of coding style, preferences, experience level, cohort;

predicting usage events for the second deprecated code in the first set of code data, using the trained multi-layer neural network model, based on the value that the second deprecated code contributes to the first set of code data;

estimating a value of risk associated with the second deprecated code in response to the prediction of usage events and the value of the second deprecated code;

comparing the estimated value of risk to a threshold; and in response to the estimated value of risk exceeding the threshold, implementing an ameliorative action in the first set of code data regarding the second deprecated code.

16. The apparatus of claim 15 wherein the ameliorative action includes deleting the second deprecated code from the first set of code data.

17. The apparatus of claim 15 wherein the ameliorative action includes replacing the second deprecated code with approved code.

18. The apparatus of claim 15 wherein the first set of code data includes data aggregated from crowdsource coding platforms.

19. The apparatus of claim 15, the method further comprising:

obtaining a training data set that includes application code and previous ameliorative actions that were performed on the application code in response to presence of the first deprecated code within the application code;

learning model weights of the multi-layer neural network model in a supervised fashion in response to the training data set;

determining the ameliorative action to be implemented by applying the multi-layer neural network model to the first set of code data using the learned model weights;

gathering user feedback that includes code markups of a second set of code data resulting from the ameliorative action that was implemented; and retraining the model weights of the multi-layer neural network model in response to the user feedback.

20. The apparatus of claim 19 further comprising:

annotating the previous ameliorative actions with priorities; and annotating two or more of the previous ameliorative actions as mutually exclusive, wherein determining the ameliorative action to be implemented includes selecting only a highest-priority action to perform.

* * * * *